United States Patent Office 3,427,290
Patented Feb. 11, 1969

3,427,290
PROCESS FOR PREPARING STEREOSPECIFIC POLYMERS WITH THE AID OF METAL PEROXIDES
Kunio Nakagawa, Nishinomiya-shi, and Tadashi Nakata, Ibaraki-shi, Japan, assignors to Shionogi & Co., Ltd., Osaka, Japan
No Drawing. Filed Dec. 20, 1963, Ser. No. 332,269
Claims priority, application Japan, Dec. 22, 1962, 37/58,520
U.S. Cl. 260—78.4      8 Claims
Int. Cl. C08f 1/60

ABSTRACT OF THE DISCLOSURE

Stereospecific polymer is produced by treating polymerizable compound having olefinic unsaturation with a peroxide of transition metal of which the metal atom has an atomic number from 21 to 48 as a solid radical initiator under polymerizable conditions, the said metal peroxide being prepared by treating a metal salt with an oxidizing agent selected from the group consisting of alkali hypohalites and alkali persulfates in an aqueous alkaline medium.

---

The present invention relates to a novel polymerization process. More particularly, it relates to a process for treating polymerizable compounds having ethylenic unsaturation with metal peroxides, particularly nickel peroxide, to produce polymers, particularly stereospecific polymers.

In the present specification, the term "polymerization" is intended to mean "homopolymerization" (in which only one kind of polymerizable compound is polymerized) and "copolymerization" (in which two or more kinds of polymerizable compounds are polymerized), inclusively. The term "metal peroxide" is expediently applied to designate the amorphous and hydrous oxide of a metal prepared by reacting a metal salt with a strong oxidizing agent such as alkali hypohalite and alkali persulfate in an aqueous alkaline medium.

An object of the present invention is to embody a new process for polymerization. Another object of this invention is to embody a process for preparing stereospecific polymers. A further object of the invention is to embody metal peroxides useful as catalysts in production of polymers, especially stereospecific polymers. These and other objects will be apparent to those conversant with the art to which the present invention pertains from the subsequent description.

Hitherto, it has been known that some radical initiators (e.g. benzoyl peroxide, azobisisobutyronitrile) can polymerize vinyl monomers. However, for production of stereospecific polymers with the aid of those radical initiators, there has been required a very low temperature around −80° C., such low temperature inevitably resulting in remarkable depression of the polymerization rate. It has been also known that Ziegler-Natta catalyst can polymerize vinyl monomers to produce stereospecific polymers. As, however, it is a catalyst for anionic coordinated polymerization, the kind of monomers for which the catalyst can be applied is limited. For instance, such a monomer as vinyl chloride and acrylonitrile is not polymerized by this type of catalyst.

According to the present process, compounds having ethylenic unsaturation can be polymerized with metal peroxides at a relatively high temperature, favorably from 0 to 60° C., without remarkable depression of the polymerization rate to give stereospecific polymers. In the present process, the peroxides act as radical initiators on monomers and, therefore, can polymerize such monomers which are not polymerized by Ziegler-Natta catalyst, as vinyl chloride and acrylonitrile. Thus, the present process may be broadly applied in industrial production of stereospecific polymers.

The process of the present invention comprises treating, under polymerization conditions, one or more polymerizable compounds (having ethylenic unsaturation) with a metal peroxide in the presence or absence of a suitable solvent.

The metal peroxide employed as a radical initiator in the present process can be generally prepared by treating a metal salt (e.g. metal chloride, metal bromide, metal sulfate, metal nitrate) with a strong oxidizing agent such as alkali hypohalite (e.g. sodium hypochlorite, potassium hypochlorite, sodium hypobromite) or alkali persulfate (e.g. sodium persulfate, potassium persulfate) in an aqueous alkaline medium followed by collecting and drying the precipitate. Preferably, the metal peroxide may be prepared by treatment of metal sulfate or metal chloride with sodium hypochlorite in water at a temperature from 10 to 25° C. After drying usually in an inert gas (e.g. nitrogen, carbon dioxide) or under reduced pressure at room temperature (10 to 30° C.), the metal peroxide is obtained in the form of fine powder insoluble in water and organic solvents. Examples of the metal peroxide include magnesium peroxide, aluminum peroxide, calcium peroxide, manganese peroxide, cobalt peroxide, nickel peroxide, copper peroxide, zinc peroxide and cadmium peroxide. Thus, there may be generally employed a metal peroxide, of which the metal atom has an atomic number from 12 to 56 in the periodic chart of elements. Of various metal peroxides as exemplified above, nickel peroxide is the most presently-preferred one in the yield of polymer. Accordingly, the preparation and property of nickel peroxide will be hereinafter described in detail.

By way of example, the following procedure shows one presently-preferred process for obtaining highly active nickel peroxide:

To a solution of nickel sulfate hydrate ($NiSO_4.6H_2O$) (130 parts by weight) in water (300 parts by volume), there is added dropwise a solution of sodium hydroxide (42 parts by weight) in 6% sodium hypochlorite (300 parts by volume) while stirring, and the resultant mixture is stirred for about 30 minutes at a temperature between 10 and 25° C. Black precipitate is collected by filtration, washed with water to remove active chlorine and adhered alkali and, after crushing the cake to powder, dried in nitrogen stream.

The nickel peroxide is a non-stoichiometric compound and a black fine powder containing a small amount of combining water. The results of quantitative analysis make it possible to give the molecular formula:

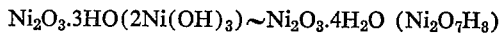
$Ni_2O_3.3HO(2Ni(OH)_3) \sim Ni_2O_3.4H_2O$ ($Ni_2O_7H_8$)

to the substance, but the structure has not yet been confirmed. The nickel peroxide possesses usually about $0.3 \sim 0.4 \times 10^{-2}$ g.-atom of atcive oxygen per gram (measured by titrating the iodine, produced from the reaction between the nickel peroxide and potassium iodide in acetic acid, with sodium thiosulfate), of which a considerable portion is lost gradually when heated but remains for a relatively long time when stored at room temperature (10 to 30° C.) under protection against light and atmospheric moisture. The activity as a radical initiator is reduced gradually while in storage and rapidly on heating. Accordingly, the use of freshly produced nickel peroxide in polymerization is preferred. However, such inactivated nickel peroxide can be readily activated by subjecting the same to treatment with a strong oxidizing agent as stated above. In this connection, it should be noted that the active nickel peroxide herein described is amorphous, while the commercially available nickel sesquioxide ($Ni_2O_3$) is crystalline and inactive.

The polymerizable monomer is one having ethylenic unsaturation in the molecule. Specific examples of the polymerizable monomer are ethylene, propylene butene-1, isobutylene, octene-1, vinyl chloride, vinylidene chloride, vinyl ethyl ether, divinyl ether, vinyl formate, vinyl acetate, vinyl propionate, methyl vinyl ketone, ethyl vinyl ketone, divinyl ketone, butadiene, isoprene, acrylonitrile, ethyl acrylate, acrylamide, methyl methacrylate, styrene, tetrafluoroethylene, maleic anhydride, diallyl n-phthalate, diallyl iso-phthalate and the like.

The reaction solvent is not always required. If used, it may be selected from such organic solvents as benzene, toluene, cyclohexanone, tetrahydrofuran and n-heptane.

The reaction conditions may be decided appropriately, in consideration of the kind of polymerizable monomer, according to the general knowledge in the field of polymerization. Although a wide range of temperature may be adapted, a temperature from 0 to 60° C. is preferred for production of stereospecific polymer. A higher temperature results in higher production of conventional polymer with decrease of the yield of stereospecific polymer and a lower temperature causes depression of the polymerization speed. As the atmospheric oxygen may act on the polymerization as an inhibitor, the reaction is normally executed in the absence of oxygen, e.g. in an inert gas such as nitrogen and carbon dioxide.

The kind of the polymer produced in the polymerization, i.e. tacticity and degree of polymerization, depends on the reaction temperature, the reaction solvent and the concentration of the used monomer and initiator. In general, the polymerization using such a monomer having relatively large polarity as methyl methacrylate is inclined to be less affected by variation in temperature to give selectively syndiotactic polymer. On the other hand, the polymerization in which such a monomer having relatively small polarity as styrene is used tends to give isotactic polymer having a higher degree of polymerization.

The present polymerization is based on the discovery of the excellent catalytic activity of metal peroxides, especially nickel peroxide and, as regards production of the stereospecific polymers it is intended that such modifications as the use of metal peroxides in combination with any other catalytic substances and/or carriers should be understood to be within the scope of the present invention.

Presently-preferred embodiments of the present invention are shown in the following examples.

In these examples, the metal peroxide used as a catalyst is prepared according to the method hereinabove disclosed and, after measurement of the active oxygen contained therein by iodometry, subjected to polymerization. The amount of the metal peroxide employed is, therefore, shown by that (g.-atom) of the active oxygen contained. Number-average degree of polymerization and viscosity-average degree of polymerization are calculated from the intrinsic viscosity in a dilute solution of polymer by the Danusso's equation [Danusso et al.: J. Polymer Science, vol. 24, p. 161 (1957)] and the Outer's equation (in parenthesis) [Outer et al.: J. Chem. Physics, vol. 18, p. 830 (1950)] and by the Meyerhoff's equation [Meyerhoff et al.: Makromol. Chem., vol. 7, p. 294 (1930)], respectively. The J-value discriminating the stereospecific configuration and conformation of the chains of polymer is determined by the Goode's equation [Goode et al.: J. Polymer Science, vol. 46, p. 317 (1960)].

EXAMPLE 1

To a suspension of nickel peroxide (0.05 g.-atom) in benzene (178 ml.), there is added styrene (50 g.), and the resultant mixture is shaken at 10° C. for 100 hours in nitrogen stream. The reaction mixture is combined with small amount of each of hydroquinone and hot benzene to inactivate the remaining active catalyst and filtered. The filtrate is, after cooling, added to about 10 times its volume of methanol while stirring. The separated substance is collected by decantation and heated with 10% hydrochloric acid and water in order, whereby contaminating nickel peroxide is eliminated. The substance collected by decantation is dried and then refluxed in n-heptane for about 12 hours. The resultant product is treated with methyl ethyl ketone to eliminate contaminating atactic polymer. The insoluble material is dried at 60° C. under 2 mm. Hg to give isotactic polystyrene. The yield is 17.5% (calculated on the basis of the amount of the product before extraction with methyl ethyl ketone).

Melting point, 218 to 221° C. Glass temperature, 82° C. Number-average degree of polymerization, 1200 (1900).

EXAMPLE 2

As in Example 1, styrene is polymerized at 0° C. for 240 hours and treated to give isotactic polystyrene in a yield of 29.4%.

Melting point, 224 to 225° C. Glass temperature, 85° C. Density, 1.08. Number-average degree of polymerization, 5300 (6700).

EXAMPLE 3

As in Example 1, styrene is polymerized in n-hexane at −10° C. for 240 hours and treated to give isotactic polystyrene in a yield of 61.3%.

Melting point, 224 to 225° C. Glass temperature, 85° C. Density, 1.08. Number-average degree of polymerization, 7400 (8900).

EXAMPLE 4

To a suspension of nickel peroxide (0.022 g.-atom) in toluene (100 ml.), there is added methyl methacrylate (22 g.), and the resultant mixture is shaken at 80° C. for 6 hours in nitrogen stream. The reaction mixture is poured into a mixture of conc. hydrochloric acid and methanol for removal of the catalyst. The substance collected by decantation is dissolved in acetone and combined with petroleum ether. The separated material is collected by decantation to give polymethyl methacrylate in a yield of 86.5% (calculated on the basis of the amount of the starting monomer). By quantitative analysis on the nuclear magnetic resonance spectrum (9.14$\tau$, 8.99$\tau$, 8.82$\tau$ and 1.18$\tau$), it is confirmed that the product contains 79.4% of syndiotactic polymer.

J-value, 110. Melting point, 188 to 190° C. Glass temperature, 115° C. Viscosity-average degree of polymerization, 436.

EXAMPLE 5

As in Example 4 methyl methacrylate is polymerized at 60° C. for 8 hours and treated to give a polymer in a yield of 78.3%, the polymer containing 80.8% of syndiotactic polymer.

J-value, 110. Melting point, 187 to 189° C. Glass temperature, 115° C. Viscosity-average degree of polymerization, 590.

EXAMPLE 6

As in Example 4, methyl methacrylate is polymerized at 20° C. for 18 hours and treated to give a polymer in a yield of 53.4%, the polymer containing 83.2% of syndiotactic polymer.

J-value, 121. Melting point, 190° C. Glass temperature, 115° C. Viscosity-average degree of polymerization, 699.

EXAMPLE 7

As in Example 4, methyl methacrylate is polymerized at 10° C. for 24 hours and treated to give a polymer in a yield of 25%, the polymer containing 87% of syndiotactic polymer.

J-value, 121. Melting point, 190° C. Glass temperature, 115° C. Viscosity-average degree of polymerization, 879.

EXAMPLE 8

As in Example 4, methyl methacrylate is polymerized at 0° C. for 72 hours and treated to give a polymer in a yield of 10.3%, the polymer containing 87.2% of syndiotactic polymer.

J-value, 120. Melting point, 190° C. Glass temperature, 115° C. Viscosity-average degree of polymerization, 1120.

EXAMPLE 9

A mixture of nickel peroxide (0.3850 g.-atom) and benzene (5 ml.) is admitted into a glass tube avoiding atmospheric oxygen. After addition of vinyl chloride (5.274 g.), the glass tube is sealed and shaken at 50° C. for 24 hours. The reaction mixture is poured into a mixture of conc. hydrochloric and methanol for removal of the catalyst. The substance collected by decantation is combined with 20 times the amount of nitrobenzene and heated in a sealed tube while refluxing. The resulting product is combined with 10 times the amount of methanol and the precipitate collected by filtration to give a polymer. The yield is 59.8% (calculated on the basis of the amount of the starting monomer).

Melting point, 165 to 180° C. Decomposing point, 210 to 215° C. $D_{638}/D_{690}=2.19$ and $D_{615}/D_{690}=2.17$. Viscosity-average degree of polymerization, 520.

EXAMPLE 10

A mixture of nickel peroxide (0.2170 g.-atom) and vinyl acetate (14.013 g.) is shaken at 25° C. for 23 hours in a sealed tube from which air has been eliminated. The reaction mixture is poured into a mixture of conc. hydrochloric acid and methanol for removal of the catalyst. The substance collected by decantation is saponoified with sodium hydroxide. The reaction mixture is dissolved in 50 times the amount of water at 140° C. in a sealed tube and, after cooling, poured into 20 times the amount of methanol to give polyvinyl alcohol in a yield of 17.8% (calculated on the basis of the amount of the starting monomer).

The polyvinyl alcohol is difficultly soluble in water at 100° C. and soluble in water at 140° C.

$$D_{916}/D_{849}=0.509$$

1,2-glycol content (determined from the amount of consumption of iodic acid), 1.008%. Absorbence of the iodineiodide complex, $\lambda_{max}$ 600 m$\mu$=1.59. Crystallinity (determined by the infrared absorption spectrum method using a sample five times stretched and treated at 200° C.), $x$=86.2%. Viscosity-average degree of polymerization, 3450.

EXAMPLE 11

A mixture of metal peroxide (2.00 g.) and styrene (10 ml.) is shaken at a certain temperature for a given time in a sealed tube from which air has been eliminated. The reaction mixture is poured into a large amount of methanol containing hydrochloric acid to precipitate the polymer with decomposition of the catalyst. The polymer is collected by decantation and dried. The results are shown in the following table:

| Metal peroxide | | | Polymerization | | Polymer | |
|---|---|---|---|---|---|---|
| Metal | Color | Active oxygen (g./atom) | Temp. (° C.) | Time (hour) | Yield (%)[1] | Insoluble part in MEK (%)[2] |
| Ni | Black | 4.00≈10⁻³ | 60 | 31 | 20.0 | 2.1 |
| | | | 35 | 90 | 15.4 | 1.9 |
| | | | 10 | 100 | 12.5 | 14.4 |
| | | | 0 | 240 | 8.5 | 29.4 |
| | | | −10 | 240 | 3.1 | 61.3 |
| Co | do | 4.21≈10⁻³ | 60 | 31 | 5.9 | 3.5 |
| | | | 35 | 90 | 3.5 | 8.4 |
| | | | 0 | 920 | 5.2 | 6.8 |
| Cu | do | 7.66≈10⁻³ | 60 | 31 | 3.1 | 5.8 |
| | | | 35 | 90 | 2.0 | 6.5 |
| | | | 0 | 175 | 0.6 | 11.0 |
| Mn | do | 5.71≈10⁻³ | 60 | 31 | 3.1 | 7.5 |
| | | | 35 | 90 | 2.5 | 10.0 |
| | | | 0 | 920 | 6.3 | 7.7 |
| Zn | White | 1.30≈10⁻⁵ | 60 | 31 | 6.1 | 2.8 |
| | | | 35 | 90 | 4.8 | 8.0 |
| | | | 0 | 920 | 4.9 | 7.6 |
| Cd | do | 9.00≈10⁻⁶ | 60 | 31 | 3.5 | 9.8 |
| | | | 35 | 90 | 1.1 | 4.7 |
| | | | 0 | 920 | 0.1 | 11.4 |
| None | | 0 | 60 | 31 | 2.0 | 0 |
| | | | 35 | 90 | 0.7 | 0 |
| | | | 0 | 175 | 0.1 | 0 |

[1] Calculated on the basis of the amount of the starting monomer.
[2] Separated after standing the mixture of the resulting polymer and a large excess of MEK (methyl ethyl ketone) at room temperature for 24 hours. Calculated on the basis of the total amount of the polymer.

EXAMPLE 12

Nickel peroxide (0.008 g.-atom) and diallyl n-phthalate (10.12 g.) are introduced into a glass tube from which air has been eliminated. After sealing, the glass tube is shaken at 60° C. for 67 hours. The reaction mixture is extracted with benzene. The benzene extract is added to the 10-fold amount of methanol. The separated crude polymer is dissolved into the 5-fold amount of benzene, filtered and combined with methanol. The precipitate is collected by filtration to give the pure product (0.86 g.).

Melting point, 125 to 130° C. Number-average molecular weight, 4089. Double bond content (determined by bromination method), 1 vinyl double bond per monomeric unit.

EXAMPLE 13

As in Example 12, the reaction between diallyl isophthalate (11.24 g.) and nickel peroxide (0.008 g.-atom) is carried out and the reaction mixture treated to give a white polymer (0.84 g.).

Melting point, 65 to 68° C. Number-average molecular weight, 3857. Double bond content, 1 vinyl double bond per monomeric unit.

EXAMPLE 14

Nickel peroxide (0.008 g.-atom) and maleic anhydride (5.14 g.) are introduced into a glass tube from which air has been eliminated. After sealing, the glass tube is shaken at 60° C. for 67 hours. The reaction mixture is extracted with methyl ethyl ketone. The methyl ethyl ketone extract is added to 10 times the amount of ether. The separated crude polymer is repeatedly purified by dissolving in methyl ethyl ketone and precipitating with ether to give the pure product (0.056 g.).

Melting point, 219 to 225° C. Number-average molecular weight, 942.

EXAMPLE 15

Nickel peroxide (0.008 g.-atom) and allyl chloride (9.38 g.) are introduced into a glass tube from which air has been eliminated. After sealing, the glass tube is shaken at 60° C. for 67 hours. The reaction mixture is extracted with benzene. The benzene extract is added to 10 times the amount of methanol. The separated crude polymer is repeatedly purified by dissolving in benzene and precipitating with methanol to give the pure product (0.145 g.).
Number-average molecular weight, 712.

What is claimed is:

1. In a catalytic polymerization of ethylenically unsaturated monomer to form stereospecific polymer, the improvement wherein the catalyst is an amorphous metal peroxide prepared in an aqueous alkaline medium by oxidizing a metal salt therein with an oxidizing agent selected from the group consisting of sodium hypochlorite, potassium hypochlorite, sodium hypobromite, sodium persulfate and potassium persulfate; the metal salt being a member selected from the group consisting of a metal chloride, a metal bromide, a metal sulfate and a metal nitrate; and the metal of the metal peroxide and of the metal salt being a metal having an atomic number of from 12 to 56.

2. In a catalytic polymerization of ethylenically unsaturated monomer to form stereospecific polymer, the improvement wherein the catalyst is an amorphous nickel peroxide prepared in an aqueous alkaline medium by oxidizing a nickel salt therein with an oxidizing agent selected from the group consisting of sodium hypochlorite, potassium hypochlorite, sodium hypobromite, sodium persulfate and potassium persulfate; the nickel salt being a member selected from the group consisting of a chloride, bromide, sulfate and nitrate.

3. In a catalytic polymerization of ethylenic unsaturated monomer to form stereospecific polymer, the improvement wherein the catalyst is an amorphous nickel peroxide prepared in an aqueous alkaline medium by oxidizing a nickel salt therein with an oxidizing agent selected from the group consisting of an alkali hypohalite and an alkali persulfate.

4. In a catalytic polymerization of ethylenic unsaturated monomer to form stereospecific polymer, the improvement wherein the catalyst is an amorphous cobalt peroxide prepared in an aqueous alkaline medium by oxidizing a cobalt salt therein with an oxidizing agent selected from the group consisting of an alkali hypohalite and an alkali persulfate.

5. In a catalytic polymerization of ethylenic unsaturated monomer to form stereospecific polymer, the improvement wherein the catalyst is an amorphous copper peroxide prepared in an aqueous alkaline medium by oxidizing a copper salt therein with an oxidizing agent selected from the group consisting of an alkali hypohalite and an alkali persulfate.

6. In a catalytic polymerization of ethylenic unsaturated monomer to form stereospecific polymer, the improvement wherein the catalyst is an amorphous manganese peroxide prepared in an aqueous alkaline medium by oxidizing a manganese salt therein with an oxidizing agent selected from the group consisting of an alkali hypohalite and an alkali persulfate.

7. In a catalytic polymerization of ethylenic unsaturated monomer to form stereospecific polymer, the improvement wherein the catalyst is an amorphous zinc peroxide prepared in an aqueous alkaline medium by oxidizing a zinc salt therein with an oxidizing agent selected from the group consisting of an alkali hypohalite and an alkali persulfate.

8. In a catalytic polymerization of ethylenic unsaturated monomer to form stereospecific polymer, the improvement wherein the catalyst is an amorphous cadmium peroxide prepared in an aqueous alkaline medium by oxidizing a cadmium salt therein with an oxidizing agent selected from the group consisting of an alkali hypohalite and an alkali persulfate.

References Cited

UNITED STATES PATENTS 2,259,180   10/1941   Schoenfeld et al.
3,141,871   1/1964    Ragazzini et al.

OTHER REFERENCES

Kirk-Othmer Encyclopedia of Chemical Technology, vol. 10, pp. 43–45.

JOSEPH L. SCHOFER, *Primary Examiner.*

J. KIGHT III, *Assistant Examiner.*

U.S. Cl. X.R.

260—78.5, 80, 82.1, 80.3, 82.3, 82.5, 83.5, 83.7, 84.1, 85.3, 85.5, 85.7, 86.1, 86.3, 86.7, 87.1, 87.3, 87.5, 87.7, 88.1, 88.2, 88.7, 89.1, 89.3, 89.5, 89.7, 91.1, 92.1, 92.8, 93.1, 93.5, 93.7, 94.2, 94.3, 94.8, 94.9, 95